Figure 2:
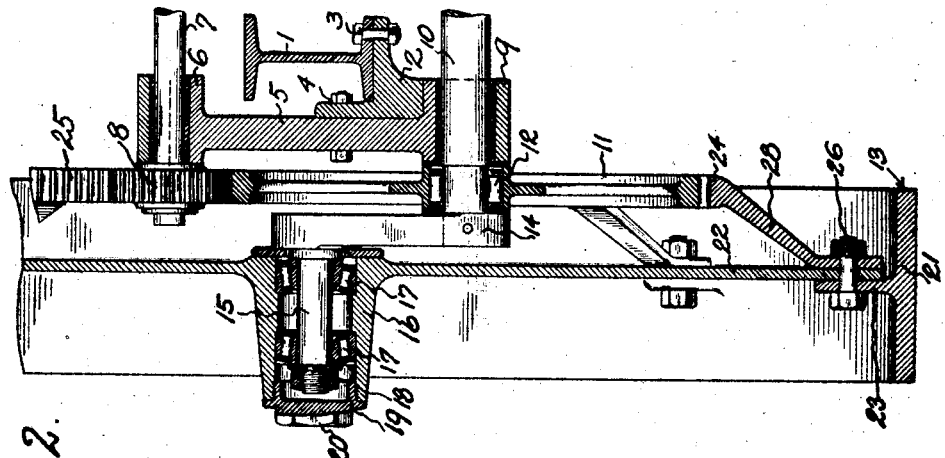

April 27, 1926.

D. P. KURTZ 1,582,282

DRIVE FOR SELF PROPELLED VEHICLES

Filed August 5, 1925

INVENTOR
Daniel P. Kurtz
By Louis C. Vanderlip
atty

Patented Apr. 27, 1926.

1,582,282

UNITED STATES PATENT OFFICE.

DANIEL P. KURTZ, OF ELKHART, INDIANA.

DRIVE FOR SELF-PROPELLED VEHICLES.

Application filed August 5, 1925. Serial No. 48,191.

*To all whom it may concern:*

Be it known that I, DANIEL P. KURTZ, a citizen of the United States, and a resident of the city of Elkhart, county of Elkhart, and State of Indiana, have invented certain new and useful Improvements in a Drive for Self-Propelled Vehicles, of which the following is a specification.

This invention relates to improvements in drives for self-propelled vehicles, tractors and the like, and pertains to that type of devices in which a transmission gearing is built into the wheel structure proper and forms a part of the same.

It is an object of the invention to arrange in compact volume within a ground wheel of a tractor, or of a self-propelled vehicle, a transmission, and to retain the axes of gears at predetermined relation to each other and to the frame of the vehicle.

The invention also has the object of providing a novel unitary supporting structure for a drive pinion and intermediate gearing in fixed relation to the frame of the vehicle.

Another object of the invention is to improve the connection between the axle of the vehicle and the hub of the vehicle wheel, to retain a connecting element in a plane substantially between the medial plane of the wheel and that of the reduction gearing, whereby the entire structure is rendered exceedingly compact and is well balanced.

With these and numerous other objects in view, an embodiment of the invention is illustrated in the accompanying drawing and described in the following specification.

Figure 1:
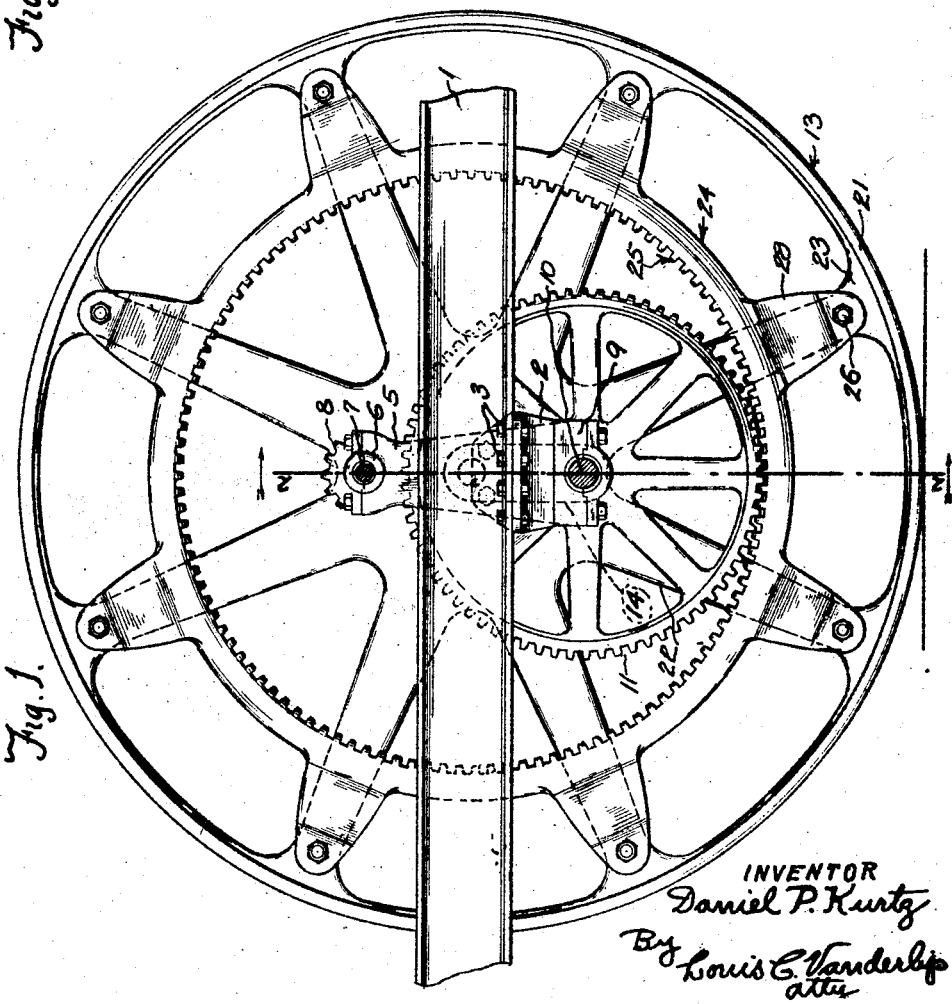

In the drawing:

Figure 1 illustrates a side elevation and part section of the wheel and frame structure, and Figure 2 is a sectional view on line 2—2 of Figure 1 on a larger scale.

A portion only of the frame of the vehicle is indicated, showing an I-beam 1 to which is secured a bracket 2 of angular cross-section the horizontal flange of the angle bracket 2 being united with the I-beam 1 as for instance by bolts 3, while the vertical flange is connected by bolts 4 with a bearing element 5 rigidly combined in this way with the frame of the vehicle. The element 5 carries a bearing at either end, the upper end bearing 6 serving for receiving the drive shaft 7 at the end of which a pinion 8 is fixedly secured in some approved way. The opposite end bearing 9 of the element 5 serve for receiving the axle 10 of the vehicle which in the embodiment illustrated is shown as an ordinary cylindrical bar, although obviously the cross-section of this axle must not necessarily be circular.

This axle 10 is extended beyond the bearing 9 to receive loosely rotatable thereon the hub of an intermediary gear 11 which is in mesh with the pinion 8 driven by the shaft 7, roller bearings 12 being interposed between the hub of the intermediary gear 11 and a suitably reduced journal portion of the axle 10.

For supporting the running wheel 13 on the axle a crank arm 14 is secured to an extension of the journal portion of the axle, and this crank arm carries near its free end a short stub shaft or pin 15 projecting within the hub 16 of the wheel. This hub is provided with a central bore having suitably finished recesses for receiving roller bearings 17 interposed between the inner face of the hub and the outer face of the pin 15, the roller bearings 17 being maintained in position by shoulders on the hub and pin and by a nut 18 respectively, which is secured to a threaded reduced extension on the pin 15. Axial displacement of the roller bearings in either direction is thereby prevented. A hub cap 19 provided with a threaded flange may be secured in the outer portion of the hub, which for this purpose has an internal thread, and this cap may carry a hexagonal extension or projection 20 to facilitate its removal or attachment to the wheel.

The wheel 13 comprises a rim or flange 21 and spokes 22 which are connected at their ends with the lugs 23 projecting inward from the rim. A circular bracket 24 having an internal gear ring 25 is secured to the spokes 22 of the wheel and to the lugs 23, as for instance by bolts 26. The circular bracket, therefore, comprises a plurality of radial projections 28 which are, however, deflected from the plane of the gear ring 25 to permit the attachment to the lugs 23 on the wheel rim.

The internal gear 25 is in engagement with the intermediary gear 11 so that upon rotation of the driving axle 9 and pinion 8 a rotary movement at a slower rate of speed is transmitted to the intermediary gear 11 which again is reduced by the engagement of this intermediary gear with the internal gear 25 forming now practically a fixed part of the wheel 13.

The parts described can readily be attached to a vehicle frame without requiring many alterations in the same or without calling for operations which would require numerous or complicated machine tools. The wheel 13 with its internal gear 25 may readily be detached from or secured to the frame of the vehicle, to facilitate repair work or exchange of parts which may have become injured during operation. It will also be seen that the axis of the wheel 13 lies about midway between the upper and lower flange of the frame beam 1 whereby an efficient, well balanced, support of the frame through the wheel is attained. The connecting element 14 between the axle 10 and the wheel 13 is disposed in a plane approximately midway between the medial plane of the wheel and the plane of gear 11, to avoid excessive twisting strains being set up in these parts.

I claim:

1. In a device of the character described, the combination of a vehicle frame, a bearing structure rigidly fixed to said frame and comprising bearing elements at the top and bottom thereof, a drive shaft extending through one of said bearings, a pinion mounted on said drive shaft, an axle mounted in the other bearing, an intermediary gear in engagement with said pinion and rotatably supported on said axle, a running wheel, and an internal gear fixedly secured to said running wheel and in engagement with said intermediary gear.

2. In a device of the character described, the combination of a vehicle frame, bearings supported by said frame above and below the same, a drive shaft extending thru one of said bearings, a pinion mounted on said drive shaft, an axle mounted in the other bearing, an intermediary gear in engagement with said pinion and rotatably supported on said axle, a running wheel, an internal gear fixedly secured to said running wheel and in engagement with said intermediary gear, and a crank arm fixedly secured to said axle and loosely supporting the running wheel.

3. In a device of the character described, the combination of a vehicle frame, bearings fixedly disposed with respect to said frame above and below the same, a drive shaft in one of said bearings, a stationary axle in another of said bearings, gears supported by said shaft and axle respectively and in engagement with each other, the axle having a journal portion, roller bearings on said journal portion and supporting gears associated with said axle, a crank shaft extending from the axle, a running wheel loosely supported by said crank shaft, and an internal gear fixedly associated with the running wheel and in engagement with one of said first named gears.

4. In a device of the character described, the combination of a vehicle frame, a bearing structure rigidly fixed to said frame and having bearing elements at the top and bottom thereof, a drive shaft in one of said bearings, a pinion mounted on the drive shaft, an axle mounted in the other bearing, a journal extension on said axle, roller bearings carried by said journal extension, another gear supported by said roller bearings and in engagement with said pinion, a crank arm fixedly secured to the axle, the gear on the axle being located between the bearing structure and said crank arm, a stub shaft on the crank arm, a running wheel rotatably mounted on said stub shaft, and a gear fixedly associated with the running wheel and engaging the gear on the axle.

5. In a device of the character described, the combination of a vehicle frame, a bearing structure rigidly fixed to said frame and having bearing elements at the top and bottom thereof, a drive shaft extending through one of the bearings, a pinion mounted on the drive shaft, an axle mounted in the other bearing, an intermediary gear in engagement with said pinion and rotatably supported on the axle, a running wheel, an internal gear fixedly secured to said running wheel and in engagement with said intermediary gear, and a crank arm fixedly secured to the axle in a plane approximately midway between the plane of the running wheel and the plane of the intermediary gear, the running wheel being loosely supported by said crank arm.

6. In a device of the character described, the combination of a vehicle frame, a bearing structure rigidly fixed to the frame and comprising bearing elements at the top and bottom thereof, a drive shaft extending through one of said bearings, a pinion mounted on the drive shaft, an axle mounted in the other bearing, an intermediary gear in engagement with said pinion, roller bearings on the axle supporting said intermediary gear, a crank arm fixed to the axle, a stub shaft projecting from said crank arm, roller bearings on said stub shaft, a running wheel carried by said roller bearings, and an internal gear ring fixed to said running gear and in engagement with said intermediary gear.

7. In a device of the character described, the combination of a vehicle frame, a bearing structure rigidly fixed to the frame and comprising bearing elements at the top and bottom thereof, a drive shaft extending through one of the bearings, a pinion mounted on the drive shaft, an axle mounted in the other bearing, an intermediary gear in engagement with said pinion and rotatably supported on the axle, a crank on said axle, a running wheel rotatably supported by said crank, a circular bracket fixed to said running wheel, an internal gear ring in said circular bracket in engagement with the intermediary gear on the axle, the bracket having projecting portions deflected from the plane of the internal gear, and means extending through the deflected portions for attaching the bracket to the running wheel.

In witness whereof I have hereunto affixed my signature this 3d day of of Aug., 1925.

DANIEL P. KURTZ.